(No Model.)
H. C. STONE.
FRICTIONAL CLUTCH FOR HARVESTERS
No. 463,752. Patented Nov. 24, 1891.
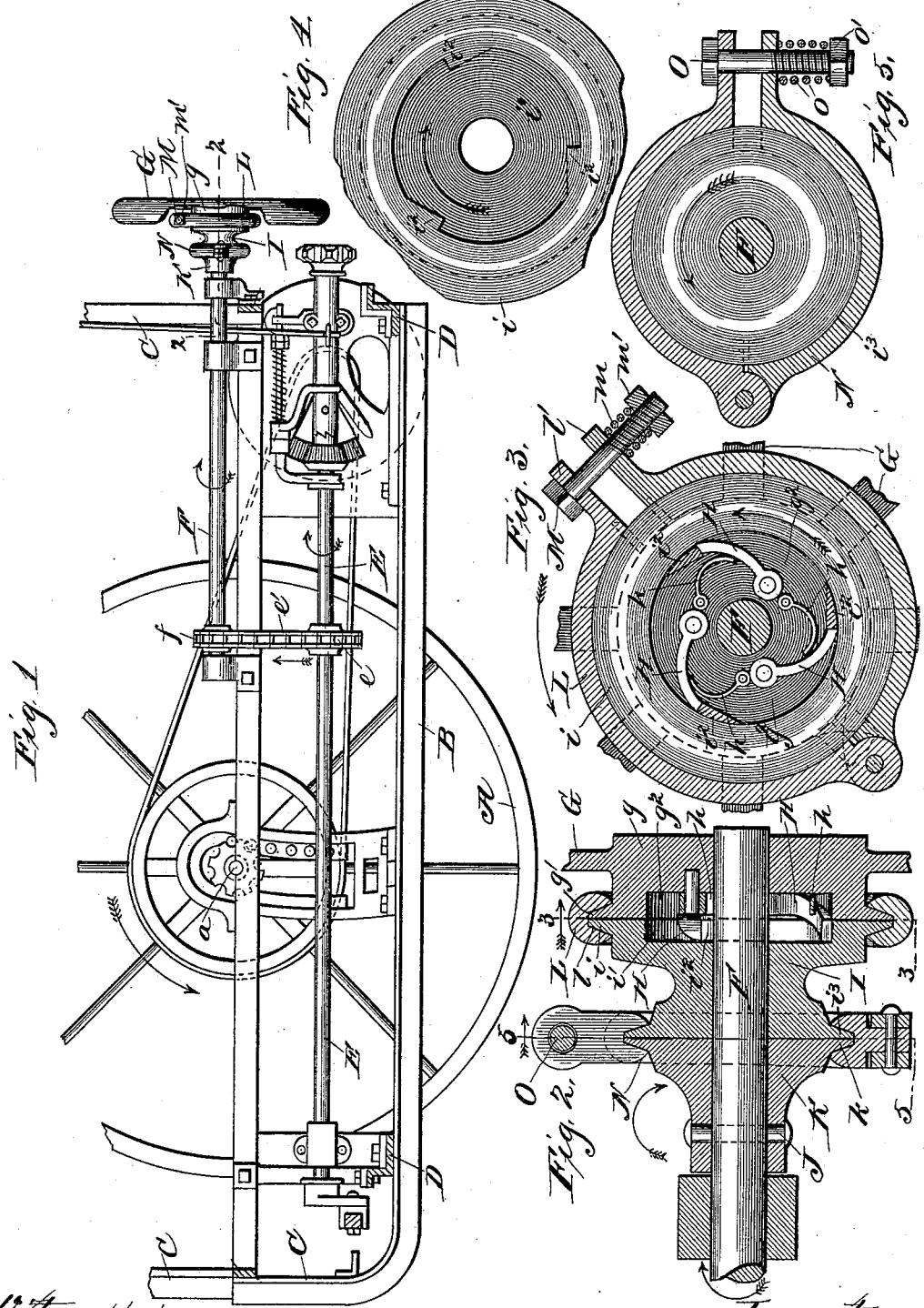
Witnesses
W. C. Coolie
Martin H. Olsen
Inventor
Henry C. Stone
By Coburn & Thacher
Attys.

UNITED STATES PATENT OFFICE.

HENRY C. STONE, OF KANSAS CITY, MISSOURI, ASSIGNOR TO OLIVE A. STONE, OF SAME PLACE.

FRICTIONAL CLUTCH FOR HARVESTERS.

SPECIFICATION forming part of Letters Patent No. 463,752, dated November 24, 1891.

Application filed August 8, 1891. Serial No. 402,109. (No model.)

*To all whom it may concern:*

Be it known that I, HENRY C. STONE, a citizen of the United States, residing at Kansas City, in the county of Jackson and State of Missouri, have invented certain new and useful Improvements in Harvesters, which are fully set forth in the following specification, reference being had to the accompanying drawings, in which—

Figure 1 is a detail elevation of a harvester embodying my invention, taken just inside of the gear-frame, the platform-sills being represented in section; Fig. 2, a detail section taken on the line 2 2 of Fig. 1; Fig. 3, a cross-section taken on the line 3 3 of Fig. 2; Fig. 4, a detail end elevation of the ratcheted face of the double friction-hub, and Fig. 5 a cross-section taken on the line 5 5 of Fig. 2. Fig. 1 is on a scale by itself. The remaining figures are on one and the same scale, but enlarged from that of Fig. 1.

My invention relates to grain-harvesting machines, and more particularly to automatic binding-harvesters, though it is applicable to all styles of harvesting-machines. It is well known that the work of a grain-binding harvester is very unsteady. At certain times this work is comparatively light, while at certain other periods—such as the latter part of the operation of packing the bundle and the operation of the knotting mechanism to tie the band—the work is very much harder. The result in an ordinary machine is a constantly-varying draft, for it will be understood, of course, that the draft depends largely upon the work the machine has to perform.

It is the object of my present invention to overcome this difficulty and provide for the steady movement of the machine by the application of a fly-wheel to the gearing. There are, however, some serious difficulties in the practical application of a fly-wheel to a harvester. The plain, simple, ordinary attachment of the wheel to some existing gear-shaft on the machine or a special counter-shaft introduced for the purpose will not afford practical satisfactory results, for reasons which will be hereinafter set forth.

My invention therefore consists in a certain mode of applying a fly-wheel to the gearing of a harvester, whereby I am able to overcome all the difficulties and secure an entirely satisfactory and beneficial result.

I will now describe in detail the construction of a harvester in which I have embodied my invention in one practical way, referring, however, to only so much of the machine as is necessary to an understanding of the invention, and will then point out more definitely in claims the particular improvements which I believe to be new and wish to secure by Letters Patent.

In the drawings, A represents the main or ground wheel of a harvester, and B the main gear-frame hung, as usual, on the axle $a$ of the main wheel and shown in the drawings as adjustable vertically thereon by well-known devices. Posts C C of the upright or elevator frame are also shown in part, and the sills D D in section, of the platform-frame. The main crank-shaft E is mounted at the inside of this gear-frame. The particular devices for this purpose are not important in the present instance and will not be described. This shaft is driven from the shaft of the main or ground wheel by any suitable means, a description of which may also be omitted here.

Just above the crank-shaft E, and parallel thereto, there is a short counter-shaft F, mounted on the rear portion of the gear-frame. This counter-shaft is provided with a chain-pinion $f$, the crank-shaft E is provided with a similar pinion $e$, and a chain $e'$ is applied to these pinions, so that motion is communicated from the shaft E to the shaft F. A fly-wheel G is mounted on the rear end of this counter-shaft at the rear of the machine. This wheel is mounted loosely on the end of the shaft, and its hub $g$ extends inward somewhat and is provided with a flange $g'$, extending outward radially from the edge of the hub and having its inside face beveled, as seen in Fig. 2. A circular recess $g^2$ is also cut in the inner face of this hub, within which is pivoted a series of pawls H, each one of which is provided with a spring $h$, operating normally to turn the pawls outward. On the same shaft F, and just inside of the fly-wheel, there is also mounted a double-faced friction-clutch I. This clutch is in the shape of a circular hub and is mounted loosely on the shaft.

Its outer face, next to the fly-wheel, is made of a size to correspond with the hub of the latter, and is provided with a projecting flange $i$, corresponding to the flange $g'$ on said hub and, like it, beveled, except that the incline is in the opposite direction, as seen in Fig. 2. This outer face of the clutch-hub is also provided with a circular recess $i'$, around the periphery of which is a series of inwardly-projecting beveled lugs $i^2$, which are adapted to engage the pawls H in one direction by reason of their construction, with straight or radial faces at one end, as seen in Figs. 3 and 4. The opposite or inner face of the clutch-hub I is shown in the drawings as a little smaller than the outer face, though this is a matter of selection. This face is flat and smooth and is extended slightly beyond the body of the hub to provide a flange $i^3$, beveled on the inside, as seen in Fig. 2. Just inside of this clutch-hub I is a hub K, which is fixed to the shaft in any suitable manner (in the drawings a rivet-bolt J is shown for this purpose) and so becomes the fixed member of the clutch. The outer face of this hub K is made to correspond with the inner face of the loose hub I, and it is provided with an outer extension or flange $k$, corresponding to the flange $i^3$ on said hub and beveled on the inner face the same as said flange $i^3$, except that the incline is in the opposite direction. Now these three parts are arranged on the shaft F as seen in Fig. 2—the fly-wheel on the end of the shaft, the loose clutch-hub next inside, and the fixed member of the clutch K just inside the former, the loose hub abutting at its outer face against the hub of the fly-wheel and at its inner face against the face of the fixed hub K. Obviously, then, the hub-clutch I is double-faced—that is, it is adapted to form a friction-clutch at each face thereof. It is also obvious that the two flanges $g'$ and $i$ abutting against each other, as seen in Fig. 2, constitute a wedge-shaped seat for the application of an ordinary friction-band, and also that the flanges $i^3$ and $k$ form a similar seat for another similar band. An ordinary two-part hinged friction-band L, provided with a wedge-shaped groove $l$, is applied to the flanges $g'$ $i$, as seen in Figs. 2 and 3, the free ends of the bands projecting outward to form lugs $l'$, by means of which the two parts of the band are fastened together, the fastening shown in the drawings being a bolt M, passing through these ends and extending considerably beyond them at the other end to provide for a spring $m$, coiled around the bolt between the fastening-nut $m'$ and the ends of the ring, as seen in Fig. 3. A similar friction band or ring N is applied to the seat made by the flanges $i^3$ $k$, this ring being also fastened by a bolt O, spring $o$, and nut $o'$, as with the former ring, and as seen in Fig. 5.

It will be seen from this description that the fly-wheel is connected to the shaft by a double clutch or by two different friction-clutches. The object of this construction is to provide a differential frictional connection between the said wheel and the shaft at different points for purposes which will presently be explained. To this end the friction-band N is applied to its seat with much greater tension than the friction-band L, and it will be noticed that the contact-surfaces at this clutch-point are considerably greater in area than at the outer clutch.

In carrying out my design it is intended to have the tension at the inner clutch effected by the band N so great as to afford a resistance that will always compel the fly-wheel and shaft to rotate together, except when the machine comes in contact with an absolute positive obstruction. For this purpose the fly-wheel is caused to engage positively with the double-faced clutch-hub I by means of the pawls and ratchets, already described, operating in one direction, this being the working operation with the several wheels and shafts moving as indicated by arrows in the drawings; but the tension at the outer clutch effected by the band L is intended to be very much less than that of the inner clutch just described. The tension at this point is intended to be regulated so that it will offer less resistance to the slipping of the contact-surfaces than is offered by the inertia of the fly-wheel when at rest. It is obvious that with a fly-wheel of considerable weight there would be a heavy strain upon the machine in starting if the fly-wheel were connected rigidly to its shaft or secured thereto by the single heavy tension-clutch described above. It is to obviate this objectionable result that the second clutch of light tension is provided, for it will be seen from Figs. 2 and 3 of the drawings that, the movement of the several parts being in the direction of the arrows when the machine is started forward, the construction of the pawls and ratchets is such that at first the counter-shaft and the hub-clutch I will turn without necessarily moving forward the fly-wheel, the light tension of the outer clutch being less than the force required to overcome the inertia of the wheel and so permitting the frictional surfaces of this clutch to slip upon each other. The inertia of the fly-wheel will thus be overcome gradually, and so no undue strain will be brought upon the machine. At the same time it will be seen that the fly-wheel connected by pawls and ratchets to the clutch-hub, as already described, will always have its full effect when once it is in full movement to impart a uniform and steady rotation to the counter-shaft, which effect is in turn imparted to the entire machine, owing to the connection with the crank-shaft already described. The result is that the variations in resistance at different times in the operation of the mechanisms of a grain-binding harvester are overcome by the operation of the fly-wheel, so that there is no sudden increase of traction at certain points in the binding operation, but the operation of the machine is comparatively regular and the draft even. At the same time the starting up of the machine from a state of rest is attended with no undue strain, but is accomplished about as easily as in a machine without a fly-wheel.

In the description of the clutch mechanism given above I have only intended to present an illustration of one good method of carrying out my invention in practical form. I do not wish to be understood as limiting my invention to this precise construction. It is obvious that the particular construction of the clutch mechanism is not material to the general improvement herein set forth. It is only required that the fly-wheel shall be connected to its shaft by two clutches differing in resistance, the lighter being less than the resistance of the inertia of the fly-wheel and the heavier being sufficiently strong to firmly connect the fly-wheel to the shaft under all circumstances, except where the machine meets an obstruction which absolutely stops its operation, when the continued operation of the fly-wheel, if absolutely fixed to its shaft, would result in breakage. The particular kind of clutch is immaterial. Any construction of clutch suitable to the purpose may be employed. The relative arrangement of the clutches may also be changed, if desired—that is, the heavier clutch may be put next to the fly-wheel and the lighter one inside thereof next to the fixed hub on the shaft—in which case the ratchet device must also be transferred to the fixed hub, for obviously this device or any equivalent device that may be employed must be located at the clutch of lighter tension. The clutches, whatever may be their construction, must, however, be of adjustable tension, so that they may be adjusted to operate as described above. Furthermore, I do not wish to be understood as limiting my invention to a counter-shaft arranged as herein described and shown, on which the fly-wheel is to be mounted. This particular application is given only as an illustration, and I contemplate mounting the fly-wheel on any regular shaft in the machine to which it may be practically applied or on a special shaft for this purpose introduced into the machine at any suitable point. The general idea of the invention may also be embodied, obviously, by separating the clutches, leaving one on the fly-wheel shaft and putting the other on some other shaft connected therewith. I desire to say, however, that the arrangement and construction of these devices which are here shown and described are very suitable for practical use, as I have found by actual use of a machine constructed in this manner, the operation of which I have found very satisfactory and attended by the beneficial results which have been mentioned above.

Having thus described my invention, what I claim as new, and desire to secure by Letters Patent, is—

1. In a harvester, a fly-wheel mounted loosely on its shaft, in combination with two clutches of differential tension, whereby said wheel is connected with the gearing of the harvester, substantially as described.

2. In a harvester, a fly-wheel mounted loosely on its shaft, in combination with a double clutch mounted on the same shaft and connected at one end to said wheel and at the other to the said shaft, with a differential tension between the said two clutch connections, substantially as described.

3. In a harvester, the shaft F, connected with and driven by the main gearing of the machine, in combination with a fly-wheel G, mounted loosely thereon, a hub K, fixed upon said shaft, a clutch-hub I, mounted loosely on said shaft between the wheel and fixed hub and in frictional contact with each, and frictional clutching devices applied to the said respective contact-faces with a differential tension, substantially as described.

4. In a harvester, the crank-shaft E, in combination with the counter-shaft F, fly-wheel G, mounted loosely thereon, fixed hub K on said shaft, double-faced clutch-hub I, mounted loosely on said shaft between the wheel and fixed hub and provided with ratchets $i^2$, frictional bands L and N, connecting the loose hub I, respectively, to the said fixed hub and fly-wheel with a differential tension, and spring-pawls H on the fly-wheel, substantially as described.

HENRY C. STONE.

Witnesses:
CARRIE FEIGEL,
HARRY D. HOLLISTER.